United States Patent [19]

Janicki

[11] Patent Number: 4,554,023
[45] Date of Patent: Nov. 19, 1985

[54] MODIFIED ASPHALT

[75] Inventor: Richard T. Janicki, Oak Lawn, Ill.

[73] Assignee: Owens-Corning Fiberglas Corporation, Toledo, Ohio

[21] Appl. No.: 556,201

[22] Filed: Nov. 29, 1983

[51] Int. Cl.$^4$ .............................................. C08L 95/00
[52] U.S. Cl. ........................... 106/273 N; 106/281 N; 428/141; 428/147
[58] Field of Search ....................... 106/273 N, 281 N; 428/141, 147

[56] References Cited

U.S. PATENT DOCUMENTS

| 2,317,959 | 4/1943 | Johnson et al. | 106/269 |
| 2,375,653 | 5/1945 | Holmes | 106/281 R |
| 2,635,966 | 4/1953 | Irvine et al. | 106/123.1 |
| 2,701,777 | 2/1955 | Farris | 427/394 |
| 2,716,616 | 8/1955 | Rendall et al. | 106/273 |
| 2,863,785 | 12/1958 | Jelling | 106/273 R |
| 2,874,174 | 2/1959 | Huber et al. | 260/404.5 |
| 2,875,219 | 2/1959 | Huber | 260/404.5 |
| 2,996,398 | 8/1961 | Huber et al. | 106/269 |
| 2,996,399 | 8/1961 | Huber et al. | 106/269 |
| 3,028,249 | 4/1962 | Holberg | 106/273 N |
| 3,808,164 | 4/1974 | Gulino et al. | 524/67 |
| 4,282,038 | 8/1981 | Earing | 106/273 N |

Primary Examiner—Paul Lieberman
Assistant Examiner—Amelia B. Yarbrough
Attorney, Agent, or Firm—Ronald C. Hudgens; Ted C. Gillespie

[57] ABSTRACT

Bis-stearoylamide is blended into asphalt, either natural or petroleum derived, to reduce the viscosity of the asphalt while maintaining its viscosity and, hence, its saturant properties.

5 Claims, No Drawings

MODIFIED ASPHALT

TECHNICAL FIELD

This invention pertains to modified asphalts.

In one of its more specific aspects, this invention pertains to asphalts modified with synthetic waxes to form compositions particularly suitable as coatings and saturants.

BACKGROUND OF THE INVENTION

It is well known in the art of roofing shingle production, to employ asphalt-based compositions as saturants on base materials such as felt, glass fibers, asbestos and the like. As extenders, it is customary to inlcude in the coating certain filler materials which increase the quantity of material saturatable by the asphalt, which materials act to absorb wear on the shingle. Such fillers, however, act to increase the viscosity of the asphalt making it less pentratable of the base materials and requiring that the application of the asphalt to the base materials be made at higher temperatures of compensate for the increase in viscosity of the asphalt upon addition of the filler.

This invention is directed to the solution of that problem and also improves the weatherability of the asphalt and tear strength of the resulting asphalt shingle.

STATEMENT OF THE INVENTION

According to this invention there is provided a composition comprising of an asphalt and bis-stearoylamide.

Also, in accordance with this invention, there are provided compositions, including roofing shingles, comprising the asphalt and bis-stearoylamide composition.

DETAILS OF THE INVENTION

The invention is applicable to natural and petroleum-derived asphalts including straight-run fractional-derived asphalts, cracked asphalts, asphalts drived from processing such as blown asphalts, propane deasphalting, steam distillation, chemically modified asphalts, and the like. In its preferred embodiment, the invention is applicable to asphalts for shingle producion having a ring and ball softening point of about 143° F.

The bis-stearoylamide can be mixed with the asphalt in any amount suitable to reduce the viscosity of the asphalt to that viscosity desired for the ultimate blend. Generally, the amount of the bis-stearoylamide will be introduced into the asphalt in an amount up to about 50 percent by weight and preferably in an amount within the range of from about 2 to about 50 percent by weight and, more preferably in the range of from about 2 to about 6 percent by weight of the blend of the two materials. The bis-stearoylamide can be introduced into the asphalt in any suitable manner, for example, as a solid into a solid or liquid, or as a liquid into a solid or liquid, the addition being made at any suitable temperature. The bis-stearoylamide can also be added in an amount sufficient to increase the softening point without significantly altering the viscosity of the asphalt.

The final combination of bis-stearoylamide and asphalt can be diluted with any suitable diluent. Further, any combination of other materials such as aggregate, asbestos, glass, and the like can be incorporated into the combination.

Application of the asphalt and bis-stearoylamide to the base material is made in the usual manner, with or without the addition of fillers.

It will be evident from the foregoing that various modifications can be made to this invention. Such, however, are considered within the scope of the invention.

I claim:

1. A roofing product including a composition comprising an asphalt and bis-stearoylamide, the bis-stearoylamide improving the weatherability of the product and constituting from about 2 to about 6% of the weight of the combination of asphalt and bis-stearoylamide.

2. In a roofing composition comprising asphalt, the improvement which comprises including bis-stearoylamide in the composition in an amount sufficient to provide improved weatherability, said amount being about 2 to about 6% by weight of the combination of asphalt and bis-stearoylamide.

3. The composition of claim 2 in which said asphalt is selected from the group consisting of natural and petroleum-derived asphalts.

4. The composition of claim 2 in which said asphalt has a ring and ball softening point of about 143° F.

5. A roofing shingle according to claim 1.

* * * * *